United States Patent
Sakamoto et al.

(10) Patent No.: US 7,286,167 B2
(45) Date of Patent: Oct. 23, 2007

(54) DIGITAL CAMERA RECORDING DYNAMIC RANGE COMPRESSION INFORMATION

(75) Inventors: Koichi Sakamoto, Saitama (JP);
Kazuhiko Takemura, Saitama (JP);
Koji Ichikawa, Saitama (JP);
Masahiko Sugimoto, Saitama (JP);
Manabu Hyodo, Saitama (JP); Masaya Tamaru, Saitama (JP)

(73) Assignee: Fujifilm Corporation, Tokyo (JP)

( * ) Notice: Subject to any disclaimer, the term of this patent is extended or adjusted under 35 U.S.C. 154(b) by 814 days.

(21) Appl. No.: 10/694,805

(22) Filed: Oct. 29, 2003

(65) Prior Publication Data
US 2004/0085461 A1 May 6, 2004

(30) Foreign Application Priority Data
Oct. 29, 2002 (JP) .......................... P. 2002-314768

(51) Int. Cl.
*H04N 5/76* (2006.01)
(52) U.S. Cl. ............................... 348/231.6; 348/222.1; 348/207.2; 348/231.99; 358/2.1; 358/301
(58) Field of Classification Search ............. 348/222.1, 348/231.99, 231.3, 231.5, 231.6, 231.9, 254, 348/207.2, 207.1, 207.99; 358/906, 1.9, 358/533, 1.2, 2.1, 3.01, 3.02, 3.07, 3.08, 358/3.11, 3.1, 3.12, 3.13; 396/208, 311, 396/310, 313, 319, 321; 347/2, 3; 382/237, 382/270, 273, 274
See application file for complete search history.

(56) References Cited

U.S. PATENT DOCUMENTS 6,101,272 A * 8/2000 Noguchi ..................... 382/167

| 6,273,535 | B1 * | 8/2001 | Inoue et al. ..................... 347/3 |
| 6,650,365 | B1 * | 11/2003 | Sato ......................... 348/231.3 |
| 6,650,437 | B1 * | 11/2003 | Nakajima .................... 358/1.9 |
| 6,891,569 | B1 * | 5/2005 | Matsuoka et al. .......... 348/302 |
| 2002/0135687 | A1 * | 9/2002 | Nakajima et al. ........ 348/231.3 |
| 2003/0108337 | A1 * | 6/2003 | Tsuchida et al. .............. 386/95 |

FOREIGN PATENT DOCUMENTS

EP  1 081 945 A2  9/2000
JP  2001-78079  3/2001

* cited by examiner

*Primary Examiner*—Vivek Srivastava
*Assistant Examiner*—Nelson D. Hernandez
(74) *Attorney, Agent, or Firm*—McGinn IP Law Group, PLLC

(57) ABSTRACT

A digital camera has a feature to photograph a subject and record the image data onto a recording medium in a dynamic range wider than that required for printing, the digital camera further having a feature to store tag information into an image file, together with the image data, and record the image file onto the recording medium, the tag information including: range compression information indicating whether dynamic range compression has been made; maximum range information indicating the maximum subject reflection factor before and after the dynamic range compression; and knee point information indicating the subject reflection factor assumed when the dynamic range compression was made.

1 Claim, 4 Drawing Sheets

DIGITAL CAMERA RECORDING DYNAMIC RANGE COMPRESSION INFORMATION

BACKGROUND OF THE INVENTION

1. Field of the Invention

The present invention relates to a digital camera comprising a feature to record image data obtained by photographing a subject onto a recording medium in a dynamic range wider than that required for printing.

2. Description of the Related Art

Wide dynamic range recorded image reproduction apparatus is known which is capable of recording an image in a dynamic range wider than that required for printing (hereinafter referred to as the wide dynamic range) and creating an image automatically density-controlled or density-corrected to a user's favorite density at later printing (refer to the Japanese Patent Laid-Open No. 2001-78079).

The apparatus described in the Japanese Patent Laid-Open No. 2001-78079 creates a folder for image files which have undergone dynamic range compression and a folder for image files which have not undergone dynamic range compression on a recording medium, and stores the corresponding image files into respective folders in order to discriminate between image files of a wide dynamic range and those of regular dynamic range. Thus, files of images photographed in a row may be stored into separate folders depending on whether they have undergone dynamic range compression. This is inconvenient in checking image files in the order of photographing or printing these files. The information on whether the image data has undergone dynamic range compression and information necessary to reproduce range-compressed image data cannot be transmitted to a printer. Thus it is difficult to reproduce a range-compressed image so that its characteristics may be fully represented.

SUMMARY OF THE INVENTION

The invention has been accomplished in view of the aforementioned circumstances and aims at providing a digital camera capable of transmitting information on the compression of dynamic range to a printer while it is being transparent to the user whether each image file is an image file of a wide dynamic range.

In order to attain the object, the invention provides a digital camera comprising a feature to photograph a subject and record the image data onto a recording medium in a dynamic range wider than that required for printing, the digital camera further comprising a feature to store tag information into an image file, together with the image data, and record the image file onto the recording medium, the tag information comprising: range compression information indicating whether dynamic range compression has been made; maximum range information indicating the maximum subject reflection factor before and after the dynamic range compression; and knee point information indicating the subject reflection factor assumed when the dynamic range compression was made.

According to the digital camera of the invention thus configured, it is possible to store tag information into an image file, together with the image data, and record the image file onto the recording medium, the tag information comprising: range compression information indicating whether dynamic range compression has been made; maximum range information indicating the maximum subject reflection factor before and after the dynamic range compression; and knee point information indicating the subject reflection factor and the gray-scale level assumed when the dynamic range compression was made.

The information on dynamic range compression is recorded as part of the tag information in an image file. Now, whether each file is a wide dynamic range image file is user-transparent. It is possible to reproduce a range-compressed image so that its characteristics may be fully represented based on the tag information recorded in an image file together with image data.

DETAILED DESCRIPTION OF THE PREFERRED EMBODIMENTS

Figure 1:
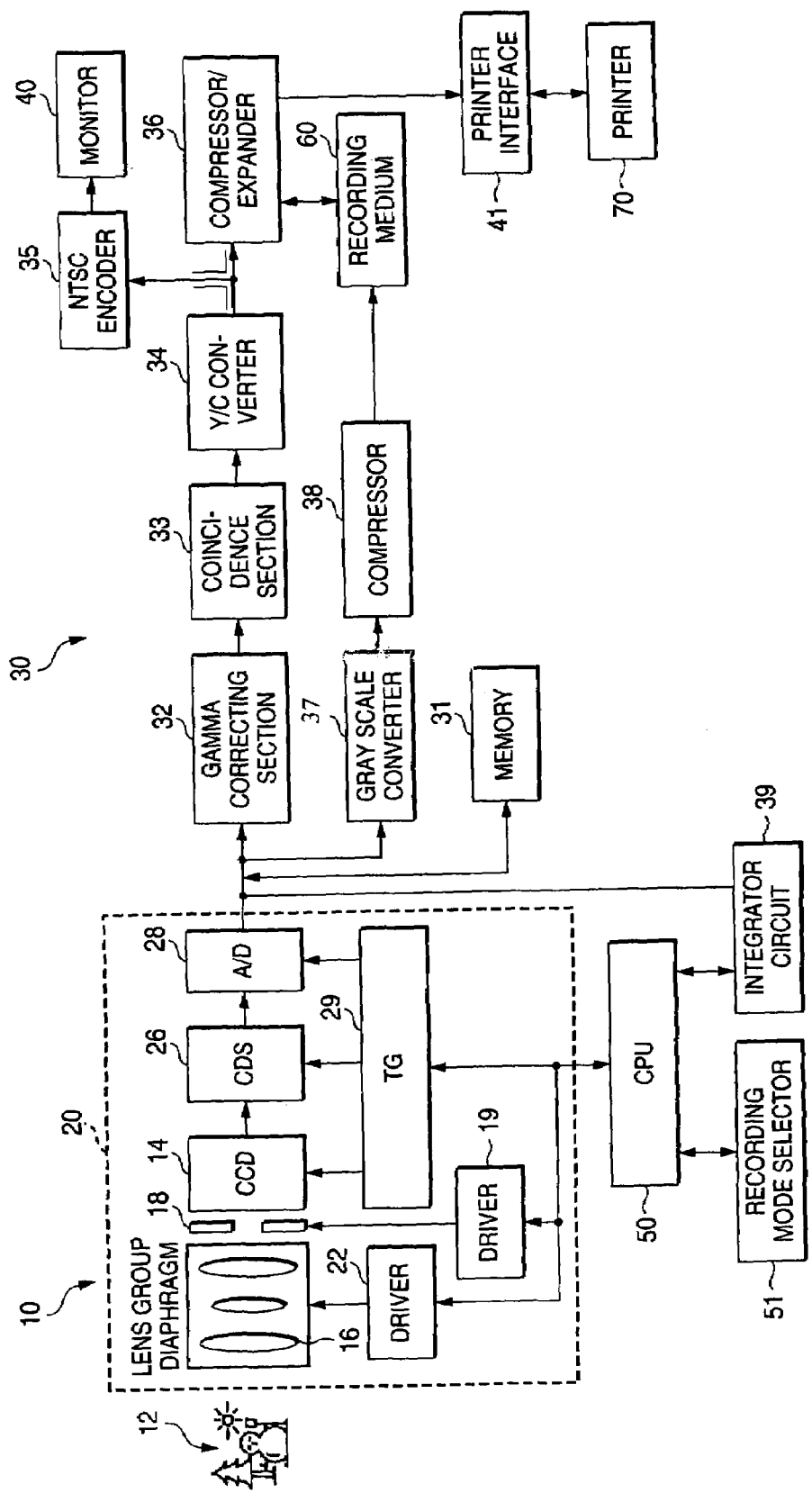
FIG. 1 is a functional block diagram showing an exemplary configuration of a digital camera according to the invention.

Embodiments of the invention will be described. FIG. 1 is a block diagram showing an exemplary configuration of a digital camera according to the invention. The digital camera 10 comprises an imaging section 20, a signal processor 30 for processing a signal obtained by the imaging section 20, a picture monitor 40, and a CPU 50 for controlling the imaging section 20, the signal processor 30 and the picture monitor 40.

The imaging section 20 comprises: a lens group 16 for forming an image of a subject 12 on a CCD (charge-coupled device) 14, a diaphragm 18 for adjusting the quantity of light reaching the CCD 14, a diaphragm driver 19 for adjusting the degree of opening of the diaphragm 18, a lens driver 22 for adjusting the position where the image of the subject 12 is formed on the CCD 14, a CDS (Correlated Double Sampling) circuit 26 for amplifying a signal from the CCD 14 and a imaging signal as well as performing correlated double sampling to obtain voltages corresponding to the quantities of light of R, G, B, G (Red, Green, Blue and Green), an A/D converter 28 for converting an analog picture signal to a digital signal, and a timing generator 29 for transmitting a timing signal to perform synchronized driving of the CCD 14, the CDS circuit 26 and the A/D converter 28 as well as control the summarizing ratio of image data, frame rate and number of pixels.

The signal processor 30 comprises a memory 31, a gamma correcting section 32, a coincidence section 33 and a YC converter 34, an NTSC encoder 35, a compressor/expander 36, a gray scale converter 37, a compressor 38, an integrator circuit 39, and a printer interface 41.

The integrator circuit 39 is provided with the AE feature of TTL which extracts the luminance component in an image from the digital signal value for each color of R, G, B, G and integrates the luminance components for a predetermined area to acquire the luminance level of the subject thus obtaining the strength of exposure (photography diaphragm and shutter speed) and the contrast AF feature which moves the lens group 16 so that the high-frequency component of the G signal in the picture signal will reach its maximum value.

The memory 31 temporarily stores the image data of each color of R, G, B, G output from the A/D converter before the data undergoes processing in the later stage. The gamma correcting section 32 performs gamma correction, optical black correction and white balance correction of image data. The coincidence section creates image data of R, G, B from the image data of the adjacent R, G and B colors. The YC converter 34 YC-converts the image data of R, G, B to luminance information and a color-difference signal.

The NTSC encoder 35 is connected to a picture monitor 40. The NTSC converts the image data YC-converted by the YC converter 34 to the display format for NTSC and outputs the resulting data as a video signal for NTSC to the picture monitor 42, before displaying the image data on the picture monitor 40.

The compressor/expander 36 compresses the image data YC-converted by the YC converter 34 before recording the image data onto the recording medium 60. The compressed image data is stored into an image file of a predetermined format together with the tag information mentioned later and recorded onto the recording medium 60. The compressor/expander 36 also expands the image data read from the recording medium 60.

The gray scale converter 37 converts the gray scale of the image data output from the A/D converter 28 before performing dynamic range recording. The gray-scale-converted image data is compressed by the compressor 38 and stored into an image file of a predetermined format together with tag information mentioned later, then recorded onto the recording medium 60.

A printer 70 is connected to the printer I/F (printer interface) 41. In case the image data recorded on the recording medium 60 is to be printed on the printer 70, the printer If 41 controls the printer 70 as well as receives an image file of image data to be printed from the compressor/expander 36 and transmits the image file to the printer 70.

The CPU 50 performs general control of the digital camera 10. To the CPU 50 is connected a recording mode selector 51 for selecting between the regular recording mode and the wide dynamic range recording mode.

Next, the photographing operation by the digital camera 10 of the above configuration will be described.

When the power of the digital camera 10 is turned on and it is set to the photographing mode (regular recording mode and or wide dynamic range recording mode), an image of the subject on the CCD 14 is converted to an electric charge by way of a photoelectronic conversion element provided on the CCD 14. The stored electric charge is output per predetermined cycle from the CCD 14 based on an instruction from the timing generator 29.

The electric charge output from the CCD 14 is converted by the CDS circuit 26 to color signals R, G, B, G of respective filter arrays in accordance with the light quantity. The R, G, B, G analog signals are converted to digital signals by the A/D converter 28 and temporarily stored into the memory 31. The digital signals read from the memory 31 undergoes a series of processing including gamma correction, optical black correction, white balance correction, coincidence and YC conversion, and the resulting images are displayed on the picture monitor 40.

The photographer operates the recording mode selector 51 of the digital camera 10 to perform photographing with the digital mode set to either the regular recording mode or the wide dynamic range recording mode.

In case photographing is made with the digital mode set to the regular recording mode, the image data (YC-converted image data) of the subject 12 displayed on the picture monitor 40 is compressed by the compressor/expander 36 and recorded onto the recording medium 60.

On the other hand, in case photographing is made with the digital mode set to wide dynamic range recording mode, the digital luminance signals of R, G, B, G output from the A/D converter 28 are temporarily stored into the memory 31 and sequentially read out and sent to the gray scale converter 37. The image data obtained by performing gray scale conversion on the luminance signals without gamma correction, coincidence or YC conversion is compressed by the compressor 38, then recorded onto the recording medium 60. In general, the printer 70 performs printing based on the R, G, B signals. Thus, by performing gray scale conversion without gamma correction, coincidence or YC conversion to generate image data and storing the resulting image data onto the recording medium 60, it is possible to obtain a good-quality printed image based on the image data recorded on the recording medium 60.

Figure 2:
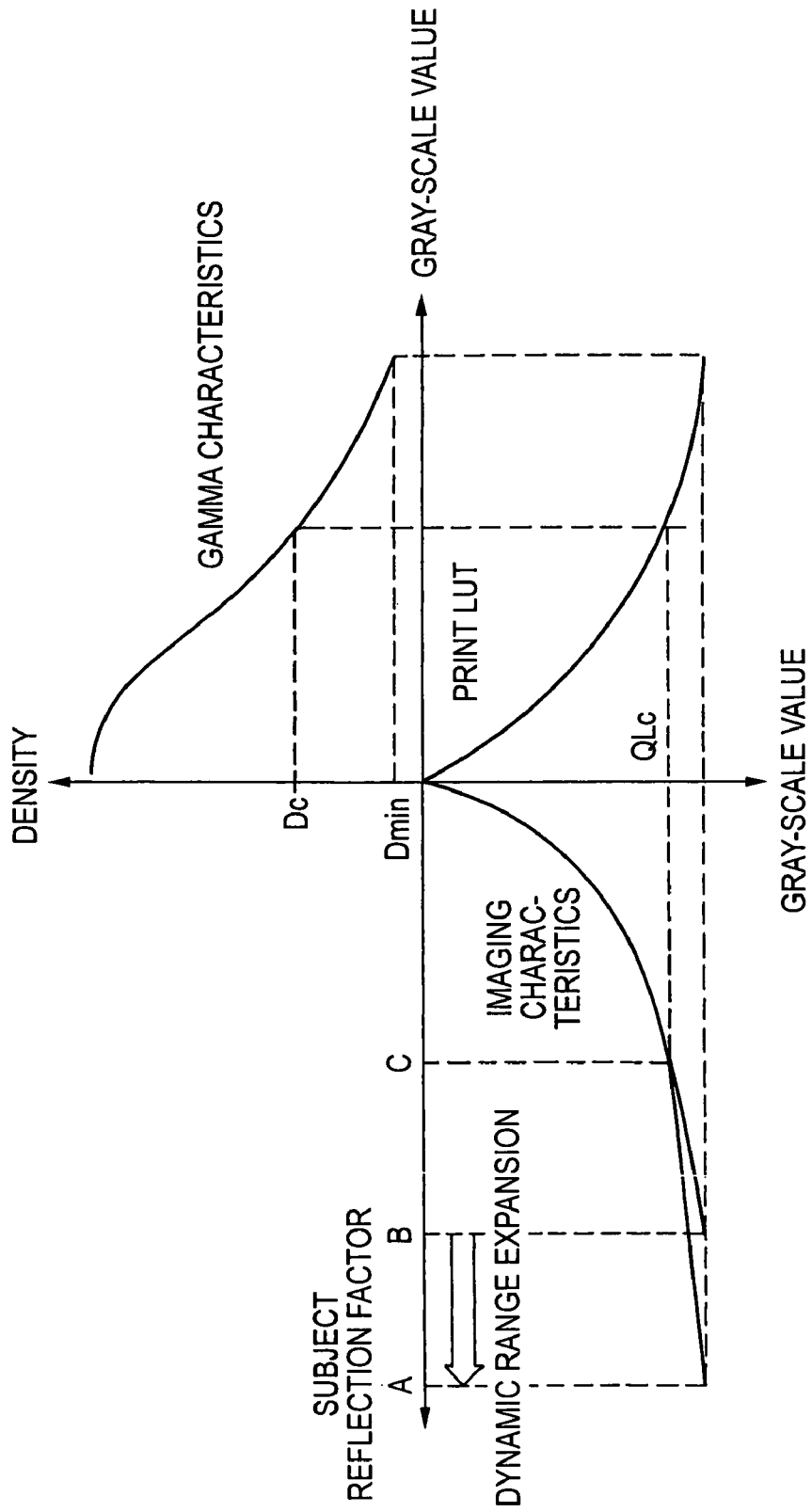
FIG. 2 shows the imaging characteristics of the digital camera, gamma characteristics of the printer and the lookup table characteristics.

FIG. 2 shows the imaging characteristics of the digital camera 10, gamma characteristics of the printer 70 and the lookup table characteristics. For wide dynamic range recording, the dynamic range of the substrate compression factor is expanded from B to A. To this end, Knee Point C is set to perform range compression. The printer 70 typically designs a lookup table assuming that the maximum substrate compression factor is B so that the density is reproduced as shown in the gamma characteristics in the first quadrant. In general, range compression uses a method for superimposing a low-density image on a high-density image.

Although the dynamic range is preserved by range compression, the contrast of a printed image may be worse. In other words, an image is reproduced using a density range of Dc through Dmin for a subject compression factor of B or below. For a subject compression factor of A or below, the range is expanded for the subject compression factor but the density range remains unchanged. This will result in lower contrast of the reproduced image.

In view of these drawbacks, the digital camera 10 comprises a feature to store tag information including the information on dynamic range compression into an image file together with image data and record the file onto the recording medium 60.

Figure 3:
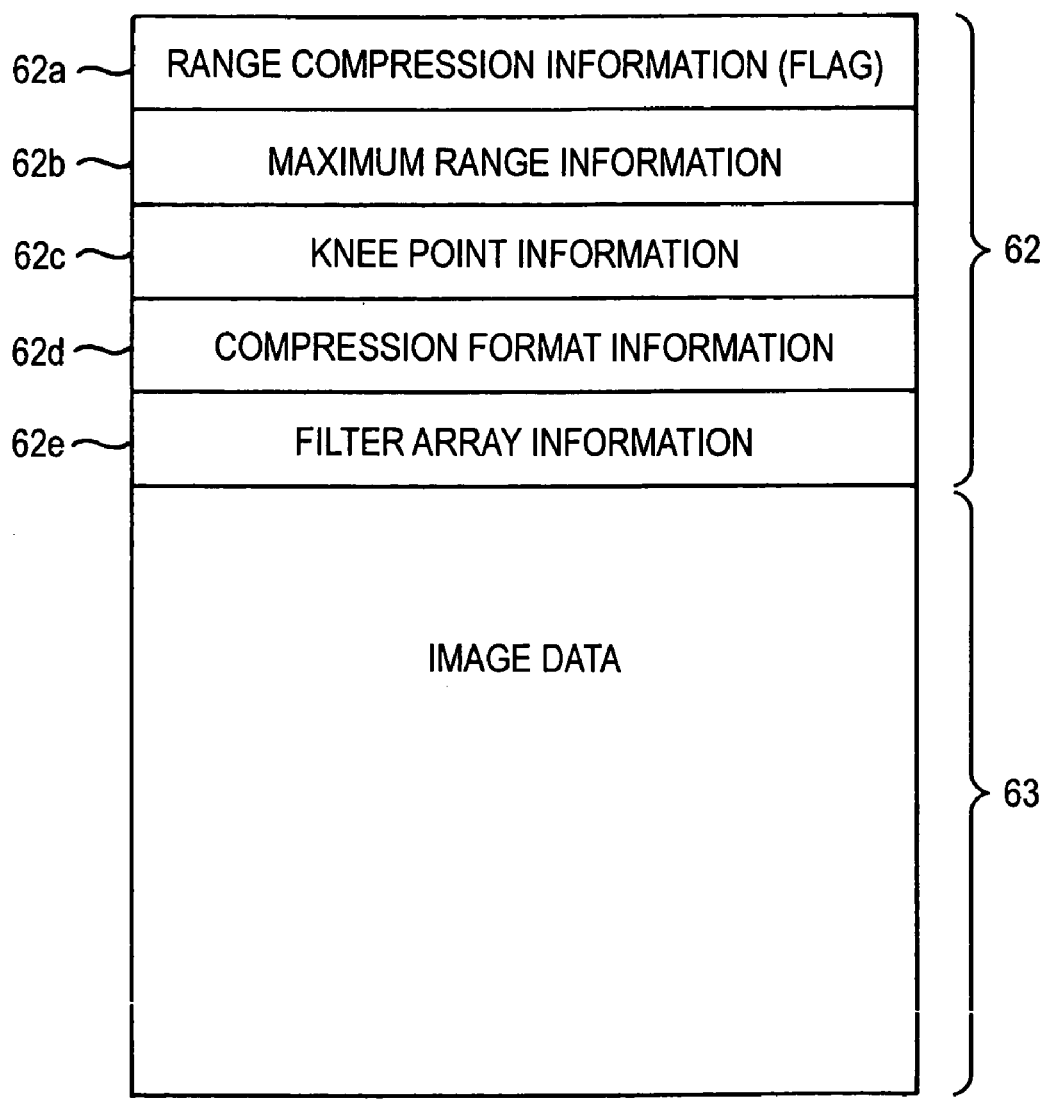
FIG. 3 shows an example of data structure of the image file recorded onto the recording medium.

FIG. 3 shows an example of data structure of the image file 61 recorded onto the recording medium 60. The image file 61 comprises a tag information area 62 and an image data area 63. In the tag information area 62 are recorded range compression information (flag) 62a indicating whether the image data was recorded in a wide dynamic range, the maximum range information 62b indicating the maximum subject reflection factor assumed before and after the dynamic range compression was made, knee point information 62c indicating the subject reflection factor assumed when the dynamic range compression was made, compression format information 62d as information indicating the presence/absence and format of data compression, and filter array information 62e indicating the filter structure for separating the output from the CCD 14 into the primary colors R, G, B. In the image data area 63 is recorded image data compressed by the compressor/expander 36 or compressor 38.

AS mentioned hereinabove, by recording the wide dynamic range recording information 62a, dynamic range information 62b and knee point information 62c in the tag information area 62 of the image file 61, it is possible, before reading arbitrary image data from the recording medium 60 to print the data on the printer 70, to transmit to the printer the information on the dynamic range compression of the image data.

Figure 4:
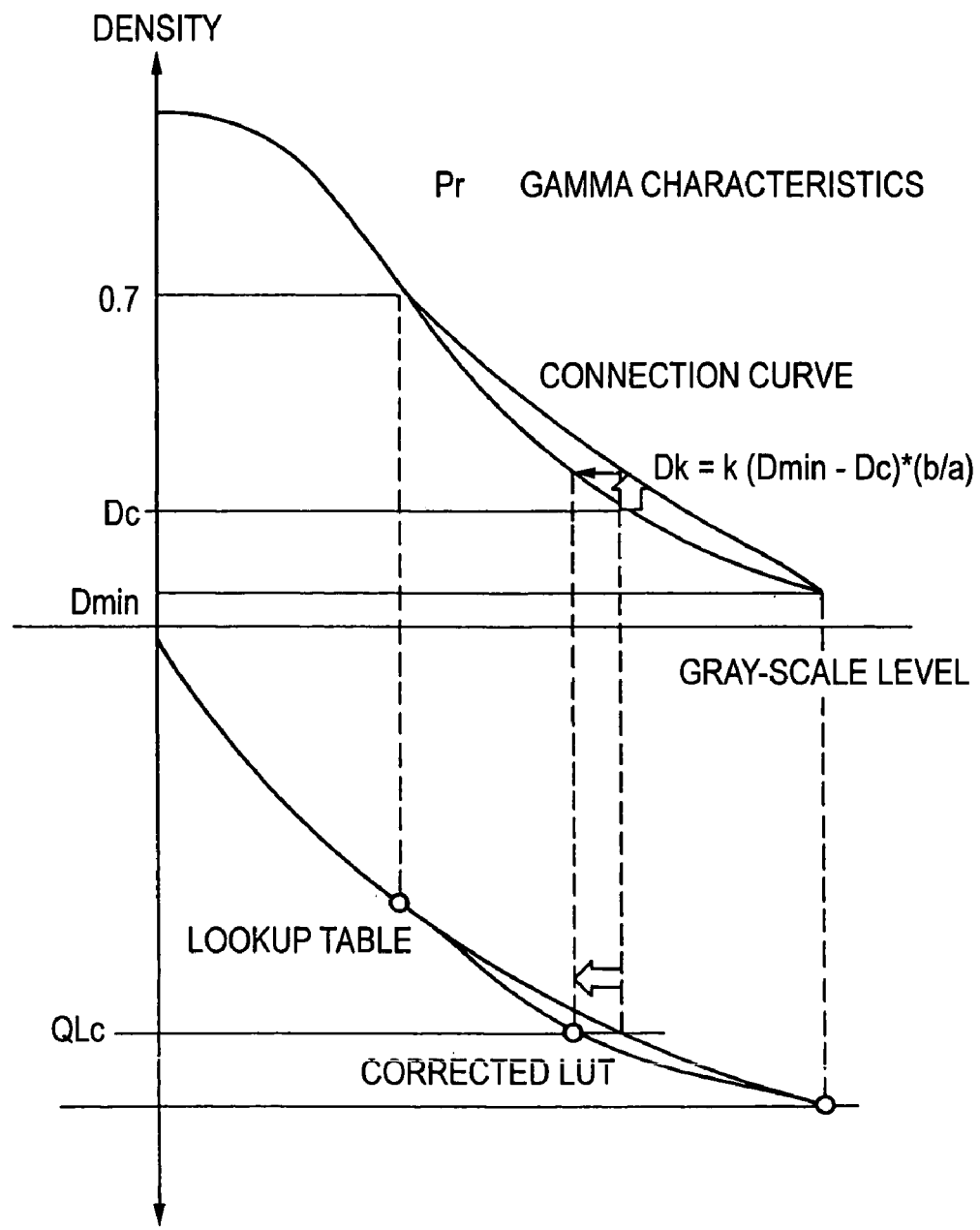
FIG. 4 shows a correction curve of the gamma characteristics and lookup table characteristics.

FIG. 4 shows a correction curve of the gamma characteristics and lookup table characteristics. The printer 70 checks the information recorded in the tag information area 62 of an image file, and only in case the image data to be reproduced is an image recorded in the wide dynamic range, that is, only in case the flag of the wide dynamic range recording information 62*a* is ON, the dynamic range information 62*b* and the knee point information 62*c* are used to correct the gamma characteristics and the lookup table characteristics.

The amount of density correction for the gray-scale level at Knee Point C is obtained using the expression (1):

$$Dk = k \times (Dmin - Dc) \times (b/a) \qquad (1)$$

In Expression (1), the factor k is an adjustment value dependent on the printer 70, a the maximum subject reflection factor before and after the dynamic range compression, b a subject reflection factor assumed when the dynamic range compression was made, and Dc the reproduced density of the printer 70 for the gray-scale level at Knee Point C.

By obtaining a necessary gray scale to acquire the amount of density correction (density rise value) Dk and obtaining a correction lookup table to link the gray-scale level and a fixed point (255 and an arbitrary fixed point, D=0.7 in the example shown) in a seamless fashion, it is possible to reproduce the gray scale featuring the range compression.

As mentioned hereinabove, according to a digital camera according to the invention, it is possible to store tag information into an image file, together with the image data obtained by photographing a subject, and record the file onto a recording medium, the tag information comprising: range compression information indicating whether dynamic range compression has been made; maximum range information indicating the maximum subject reflection factor before and after the dynamic range compression; and knee point information indicating the subject reflection factor assumed when the dynamic range compression was made. Thus, whether each file is a wide dynamic range image file is user-transparent. It is possible, when reproducing image data recorded onto a recording media on image reproduction apparatus such as a printer and a display unit, to reproduce a range-compressed image so as to feature the characteristics based on the tag information recorded in the image file together with the image data.

What is claimed is:

1. A digital camera comprising a feature to photograph a subject and record the image data onto a recording medium in a dynamic range wider than that required for printing, said digital camera further comprising:
    a feature to store tag information into an image file, together with said image data, and record the image file onto said recording medium, said tag information comprising: range compression information indicating whether dynamic range compression has been made; maximum range information indicating the maximum subject reflection factor before and after the dynamic range compression; and knee point information indicating the subject reflection factor assumed when the dynamic range compression was made.

* * * * *